US012573909B2

(12) United States Patent
Gulley et al.

(10) Patent No.: US 12,573,909 B2
(45) Date of Patent: Mar. 10, 2026

(54) ELECTRICAL MACHINE HAVING A LEAD RETENTION ASSEMBLY

(71) Applicant: GE Aviation Systems LLC, Grand Rapids, MI (US)

(72) Inventors: Jason Randall Gulley, Liberty Township, OH (US); David Philip Porzio, Dayton, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 349 days.

(21) Appl. No.: 18/189,650

(22) Filed: Mar. 24, 2023

(65) Prior Publication Data

US 2024/0322634 A1 Sep. 26, 2024

(51) Int. Cl.
| | |
|---|---|
| *H02K 3/50* | (2006.01) |
| *H02K 7/18* | (2006.01) |
| *H02K 15/32* | (2025.01) |
| *B64D 27/24* | (2006.01) |
| *F02C 7/36* | (2006.01) |

(52) U.S. Cl.
CPC ............. *H02K 3/50* (2013.01); *H02K 7/1823* (2013.01); *H02K 15/32* (2025.01); *B64D 27/24* (2013.01); *F02C 7/36* (2013.01); *F05D 2220/76* (2013.01); *H02K 2203/06* (2013.01)

(58) Field of Classification Search
CPC ........ H02K 3/50; H02K 15/32; H02K 7/1823; H02K 2203/06; B64D 27/24; F02C 7/36; F05D 2220/76
See application file for complete search history.

(56) References Cited

U.S. PATENT DOCUMENTS

| | | | |
|---|---|---|---|
| 2,519,219 A | 8/1950 | Baudry | |
| 2,592,070 A | 4/1952 | Robinson | |
| 5,519,273 A | 5/1996 | Keck | |
| 5,545,939 A | 8/1996 | Cooper | |
| 6,392,323 B1 | 5/2002 | Parker | |
| 6,824,432 B2 | 11/2004 | Katsuzawa et al. | |
| 6,859,019 B2 | 2/2005 | Tornquist et al. | |
| 11,025,114 B2 | 6/2021 | Sridharan | |
| 11,444,499 B1 | 9/2022 | Higgins et al. | |
| 2006/0284488 A1 | 12/2006 | Mori | |
| 2007/0159017 A1 | 7/2007 | Martin et al. | |
| 2007/0267935 A1 | 11/2007 | York | |
| 2010/0123360 A1 | 5/2010 | McDowall et al. | |
| 2014/0246957 A1* | 9/2014 | Grosskopf ........... | H02K 11/028 310/67 R |
| 2018/0375400 A1 | 12/2018 | Ahrens et al. | |
| 2021/0249930 A1 | 8/2021 | Leisinger et al. | |

FOREIGN PATENT DOCUMENTS

| | | |
|---|---|---|
| CN | 101702559 A | 5/2010 |
| CN | 112583180 A | 3/2021 |
| CN | 113014050 B | 5/2022 |
| EP | 0604064 B1 | 6/1994 |
| EP | 3675332 A1 | 7/2020 |
| WO | 2007136475 A1 | 11/2007 |

\* cited by examiner

*Primary Examiner* — Terrance L Kenerly
(74) *Attorney, Agent, or Firm* — Thomas I Horstemeyer, LLP

(57) ABSTRACT

An electrical machine can include a rotor core rotatably coupled to a shaft, and having a set of rotor windings including a termination end extending axially out the core and electrically connected to a terminal. A lead restraint assembly is arranged to rotatably restrain the termination end in a channel.

20 Claims, 11 Drawing Sheets

10

16

17

20

ELECTRICAL MACHINE HAVING A LEAD RETENTION ASSEMBLY

TECHNICAL FIELD

This disclosure generally relates to an electrical machine, and more specifically to methods and apparatus for electrical machines, and more specifically still, to a lead retention assembly for retaining and securing leads of an electrical machine.

BACKGROUND

Electrical machines, such as electrical motors or electrical generators, are used in energy conversion. For example, in the aircraft industry, it is common to find an electrical motor having a combination of motor and generator modes, where the electrical machine, in motor mode, is used to start an aircraft engine, and, depending on the mode, can additionally function as a generator to supply electrical power to the aircraft systems. The electrical machine can further drive other portions of the aircraft engine, such as a forward fan or a propeller.

BRIEF DESCRIPTION OF THE DRAWINGS

A full and enabling disclosure of the present description, including the best mode thereof, directed to one of ordinary skill in the art, is set forth in the specification, which refers to the appended FIGS., in which.

DETAILED DESCRIPTION

Figure 1:
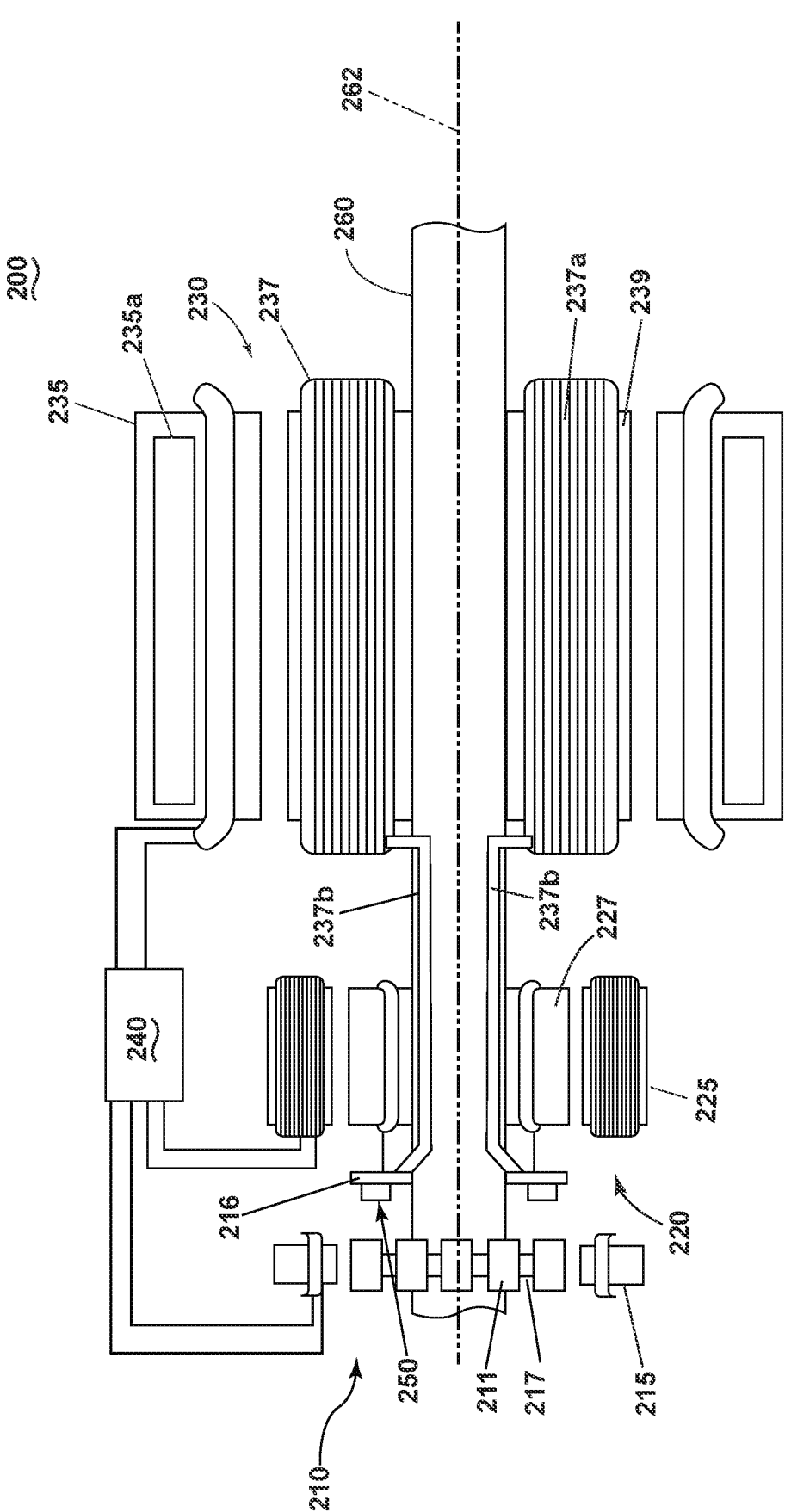
FIG. 1 is a schematic depiction of a conventional generator system.

While "a set of" various elements will be described, it will be understood that "a set" can include any number of the respective elements, including only one element. As used herein, the terms "axial" or "axially" refers to a dimension along a longitudinal axis of a device, such as a generator, or along a longitudinal axis of a component disposed within the device.

As used herein, the terms "radial" or "radially" refer to a dimension extending between a center longitudinal axis, an outer circumference, or a circular or annular component disposed thereof. The use of the terms "proximal" or "proximally," either by themselves or in conjunction with the terms "radial" or "radially," refers to moving in a direction toward the center longitudinal axis, or a component being relatively closer to the center longitudinal axis as compared to another component.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof.

Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other.

As used herein, the phrase "magnetic pole" or "pole" refers to any region within a rotor assembly defined by magnetic properties that generate a magnetic pole. For example, the magnetic poles can be defined by a region of the rotor assembly magnetized by a magnetic element of the rotor assembly such as, but not limited to, a permanent magnet, an energizable or electromagnetic rotor winding that gains magnetic properties when energized by electric current, or a magnetic material. As used herein, "magnet", or the like, refers to any element of the rotor assembly including magnetic properties configured to generate a magnetic field.

Aspects of the disclosure described herein are directed to an electrical machine, and more specifically to a rotor assembly for an electrical machine. The rotor assembly, as described herein, can include a rotatable element defining a central rotational axis and defining a periphery. A set of rotor windings can be wound about the periphery. For the purposes of illustration, exemplary aspects will be described herein in the form of an electrical machine, specifically a generator, for a gas turbine engine and having a rotor assembly. It will be appreciated however, that the electrical machine can be in the form of a generator, a motor, a permanent magnet generator (PMG), or a starter/generator (S/G), and the like, in non-limiting examples. It will be further understood, however, that aspects of the disclosure described herein are not so limited and can have general applicability within other electrical machines or systems. For example, the disclosure can have applicability for systems in other engines or vehicles, and may be used to provide benefits in industrial, commercial, and residential applications.

For example, conventional wound-rotor generators, are a major source of commercial electrical energy. They are commonly used to convert the mechanical power output of steam turbines, gas turbines, reciprocating engines and hydro turbines into electrical power. Typically, these electrical machines include a central rotatable assembly or "rotor" that is circumscribed by a stationary assembly or "stator". A small air gap separates the rotor and stator. The rotor can include a rotatable shaft and a "rotor core" including one or more sets of conductive rotor windings. The rotor windings can be axially wound around a set of posts or rotor teeth defining slots therebetween. The number of sets of rotor windings can define the number of electrical phases of the electrical machine. For example, a particular conventional rotor can have three sets of rotor windings circumferentially spaced about the rotor, and can be used to power a typical 3-phase AC power circuit. The rotor windings can include respective terminal ends connected to a secondary circuit. For example, the secondary circuit can include a rectifier, slip rings, brushes, and external resistors, and the like. In other conventional arrangements, the rotor windings can alternatively be connected to a primary output or an inverter, for example in a double fed induction generator.

The stator can include one or more sets of conductive stator windings. The stator windings can be wound around a set of posts or stator teeth defined along the stator, and can be disposed in a set of axially-extending elongate slots defined between pairs of immediately adjacent stator teeth. Typically, in operation, the stator windings are connected to an AC power source to receive an AC current, which induces an electromagnetic field (EMF) in the rotor. Each of the stator windings are fed by a respective phase of AC current. The alternating polarity of the AC current causes the direction of current flow in the windings to alternate, changing the orientation of the stator EMF in phase with the AC frequency. The varying current creates an apparent "rotating" magnetic field (RMF), through the stator, which induces an opposing EMF in the rotor windings, thereby causing a rotational force on the rotor.

More specifically, referring to FIG. 1, a schematic depiction of a conventional generator system 200 is shown. Typically, the generator system 200 includes a PMG 210, an exciter 220, and a main generator 230. The PMG 210 includes a PMG stator 215 and a PMG rotor 217. The PMG 210 includes permanent magnets 211 on its rotor 217. The PMG 210, the exciter 220, and the main generator 230 are coupled to a common rotatable shaft 260 having a central longitudinal axis defining a common axis of rotation 262. The exciter 220 includes an exciter stator 225, an exciter rotor 227. The main generator 230 includes a stationary main armature, or generator stator 235, and a rotatable main field, or generator rotor 237. The generator stator 235 can include one or more sets of stator windings 235a. The generator rotor 237 can include a rotor core 239 defining a set of axially-extending slots, with one or more sets of rotor windings 237a disposed in the slots. In some arrangements, the main generator 230 can have a generator rotor 237 having a single set of rotor windings 237a, and a stator 235 having a number of stator windings 235a that define a number of electrical phases of AC power output of the main generator 230 with each set of stator windings 235a corresponding to a respective electrical phase. Alternatively, in other arrangements, the number of sets of rotor windings 237a can define the number of electrical phases of AC power output of the main generator 230 with each set of rotor windings 237a corresponding to a respective electrical phase. A regulator 240 is coupled to the PMG stator 215, the exciter stator 225, and the generator stator 235. A rectifier 250, such as a full-wave bridge rectifier, is shown electrically coupled between the exciter rotor 227 and the generator rotor 237. The rectifier 250 typically includes one or more rectifier circuits (not shown). Each of the at least one rotor windings 237a can have a winding termination end 237b. The winding termination end 237b can define or be coupled to an input lead (not shown). The termination end 237b of each rotor winding 237a can extend axially outward from an axial end of the rotor core 239. An electrical connection between the rotor windings 237a and the rectifier 250 is arranged by extending the termination end 237b from rotor core 239 to the rectifier 250. Each termination end 237b can be coupled to a respective circuit of the rectifier 250, for example via a terminal 216. While FIG. 1 depicts the rectifier 250 as disposed between the exciter rotor 227 and the PMG rotor 217, this is only by way of example. In other known arrangements, the rectifier 250 can be disposed in other locations as desired. For example, in some generator systems 200, the rectifier 250 can be disposed between the main generator 230 and exciter 220. In still other arrangements, the rectifier 250 can be disposed in a cavity (not shown) defined within the rotatable shaft 260, for example proximal to the main generator 230. An opening (not shown) can be defined in the shaft 260 to enable an electrical connection of the termination end 237b to the rectifier 250. In some instances, the termination end 237b can be secured to a surface of the rotatable shaft 260. Conventional generator systems can have a single-phase AC power output or a poly-phase AC power output (e.g., 3-phase AC). Additionally, the main generator 230 can be a variable frequency generator (VFG), which can provide the AC power output in a range of frequencies.

In operation, the PMG 210, the exciter 220, and the main generator 230 rotate about the axis of rotation 262 at the same rotational speed. While rotating, the PMG 210 typically provides an Alternating Current (AC) power output to the regulator 240, which in turn provides a Direct Current (DC) power output to the exciter stator 225. The exciter rotor 227 provides AC power to the rectifier 250, which is converted to DC power and provided at an output of the rectifier 250. The DC current from the rectifier 250 is provided, via the termination end 237b, to the generator rotor windings 237a, which establishes a magnetic field around the periphery of generator rotor 237.

In some cases, conventional generators installed in aircraft can be variable frequency generators that rotate at relatively high-speeds (e.g., 24,000 rpm). Relatively large centrifugal and axial forces can be imposed upon the main generator 230, including upon the winding termination end 237b. Since the connections between the rectifier circuits and the rotor 237 of the main generator 230 are typically provided by wires, the repeated application of strong centrifugal forces and vibrations under normal operation can weaken or break the wire connections over time.

Consequently, rotors typically require rugged construction to tolerate such forces over long periods of time, and despite this rugged construction, such rotors typically need to remain balanced to minimize inefficiencies and the risk of failures associated with improper balancing at high rotational speeds. In many cases, the output or input leads from the rotor windings must be restrained, typically via epoxy potting or other adhesives, or by mechanical fasteners that secure the leads to the rotatable shaft. Such conventional techniques often require manual assembly, and added cost. Additionally, conventional techniques to secure the leads from the rotor can be labor intensive and, in some cases, can lead to dynamic imbalances in the rotor during operation. Moreover, due to the inherent operating forces and the mechanical robustness required of the wire and restraints, special wire, such as fatigue resistant, Polytetrafluoroethylene (PTFE) coated wire with a thick insulation jacket, is often used. However, this special coated wire necessitates additional welding or brazing of the wire to the rotor winding, and adds to the cost of manufacturing. In other conventional arrangements, rigid bus bars are used in lieu of wire leads to provide additional rigidity, with fasteners likewise required to restrain the busbars. Such arrangements often require manual assembly, and added cost.

Thus, there is a need for a high-speed electrical machine having improved output lead retention. For example, there is a need for a rotor core having an improved electrical coupling with the DC power output from a rectifier (e.g., of an exciter) in order to improve reliability of the connection, improved dynamic balance of the rotor, while enabling easier, lower cost assembly.

Aspects as disclosed herein improve upon existing methods by securing, protecting, and constraining the rotor leads or winding termination ends from the point where they exit the rotor core to their respective points of termination. Aspects as disclosed herein prevent movement of the leads and provide mechanical and electrical isolation between the winding termination ends and/or the lead wire and the shaft. Aspects as disclosed herein further secure the lead wire in such a way that the winding termination ends can be routed directly to the point of termination without the need or a reduced need for special wires or coatings.

Figure 2:
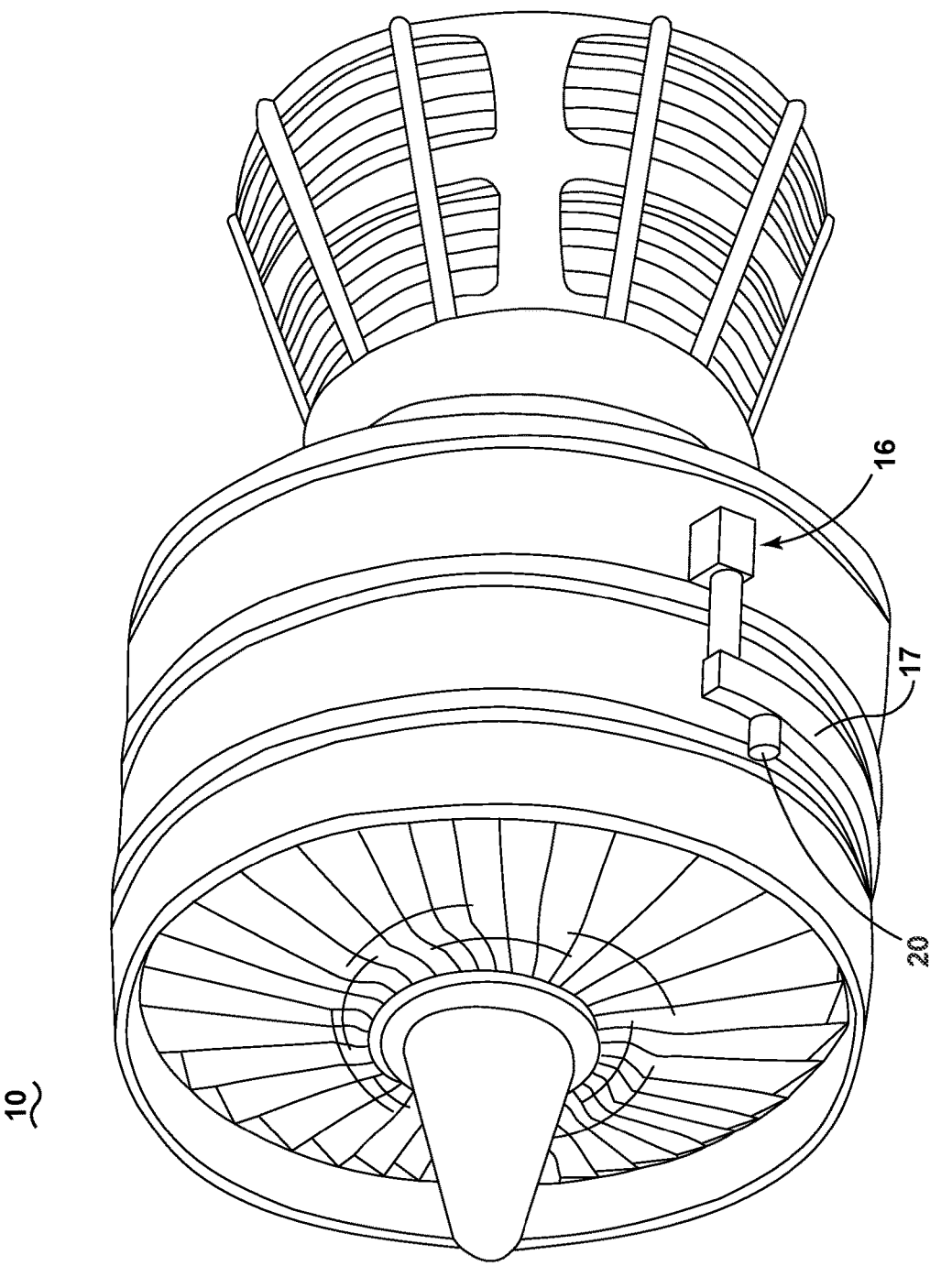
FIG. 2 is an isometric view of a turbine engine having an electrical machine, in accordance with various aspects described herein.

FIG. 2 illustrates a gas turbine engine 10 having an Accessory Gear Box (AGB) 17 and an electrical machine, specifically a generator 20, according to a non-limiting aspect of the disclosure. The gas turbine engine 10 can be a turbofan engine commonly used in modern commercial aviation. The AGB 17 can be coupled to a turbine shaft (not shown) of the gas turbine engine 10 by way of a mechanical power take-off 16. The gas turbine engine 10 can be any suitable gas turbine engine used in modern aviation. For example, the gas turbine engine 10 can be any of a variety of other known gas turbine engines such as a turboprop, turboshaft, or a counter-rotating turbine engine. The type and specifics of the gas turbine engine 10 are not germane to the disclosure and will not be described further herein. Further yet, although described in terms of the gas turbine engine 10, it will be appreciated that the generator 20 can be included within any suitable engine or prime mover. While a generator 20 is shown and described, it will be appreciated that the generator 20, can be any electrical machine including, but not limited to, an electrical motor, generator, or a starter/generator.

Figure 3:
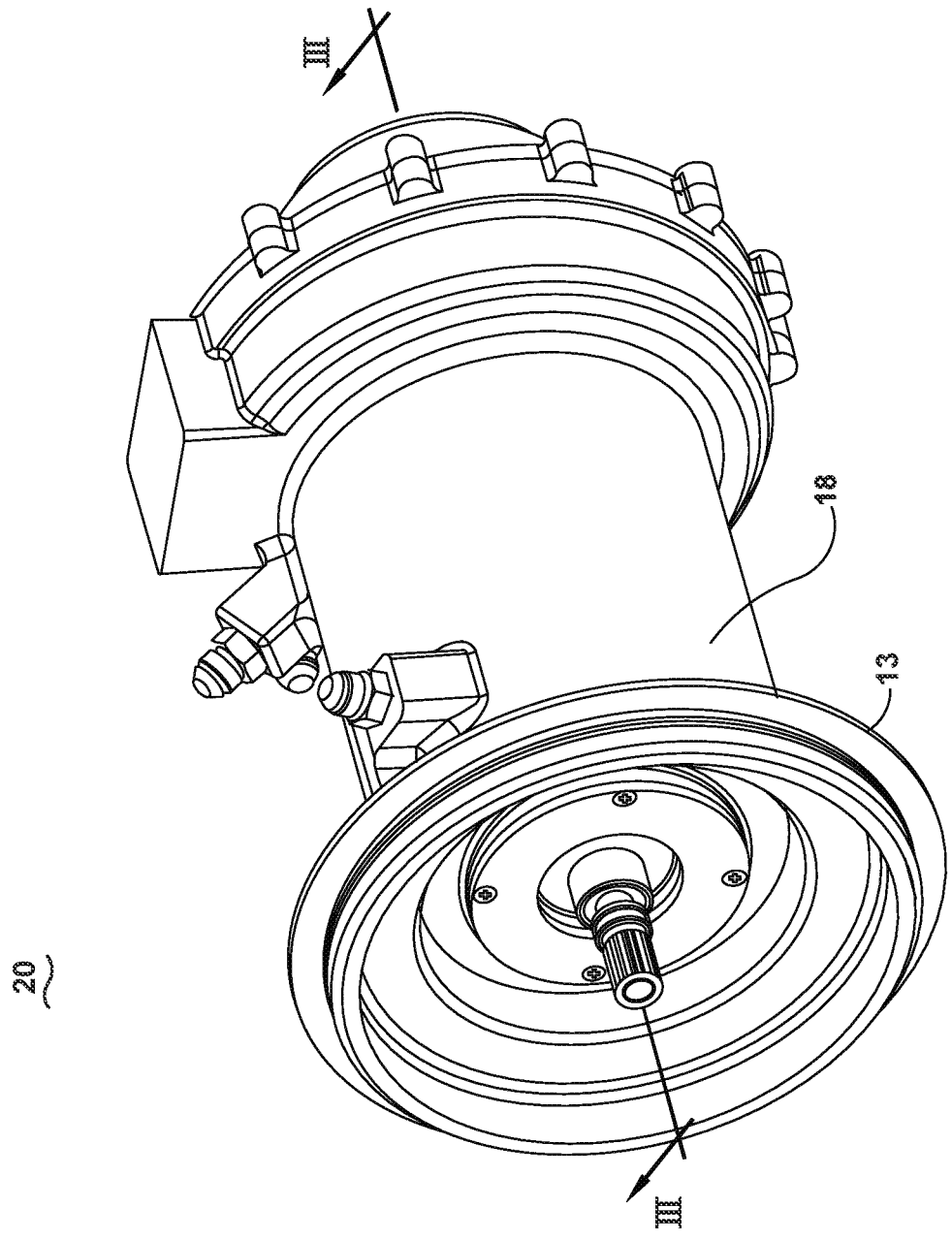
FIG. 3 is an isometric view of an exterior of the electrical machine of FIG. 2, in accordance with various aspects described herein.

FIG. 3 illustrates a non-limiting example generator 20 and its housing 18 in accordance with aspects of the disclosure. The generator 20 can include a clamping interface 13 used to clamp the generator 20 to, e.g., the AGB 17 (FIG. 2). A set of electrical connections can be provided on the exterior of the generator 20 to provide for the transfer of electrical power to and from the generator 20. The set of electrical connections can be further connected by cables to an electrical power distribution node of an aircraft having the gas turbine engine 10 to power various items on the aircraft, such as lights, seat-back monitors, on-board aircraft flight computers, or a variety of other loads, such as, but not limited to, actuators, electrical busses, batteries, deicing equipment, motors, flight controls, back up equipment, or any combination thereof.

Figure 4:
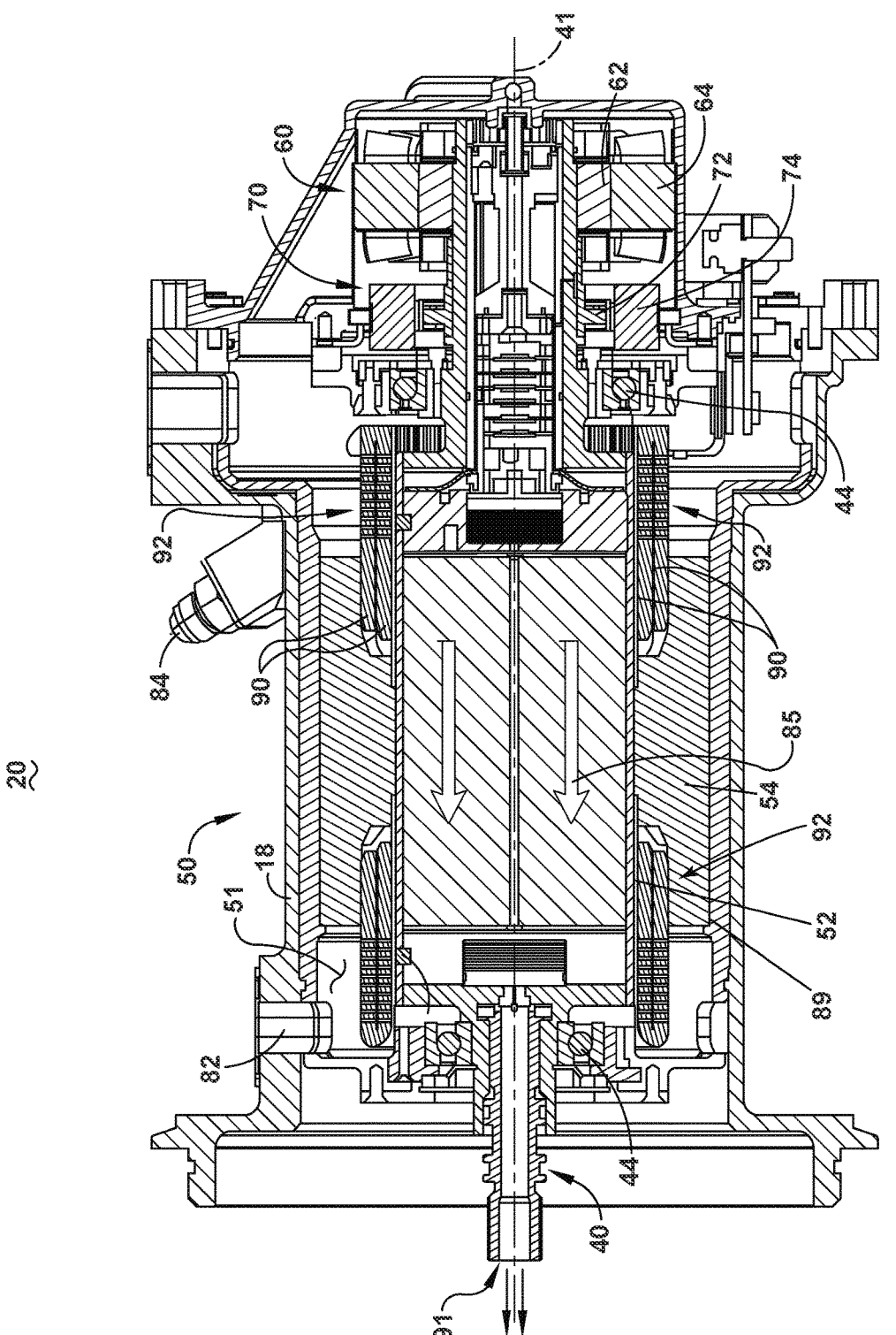
FIG. 4 is a schematic cross-sectional view of the electrical machine of FIG. 3, taken along line III-III of FIG. 3, in accordance with various aspects described herein.

A non-limiting interior of the generator 20 is best seen in FIG. 4, which is a cross-sectional view of the generator 20 shown in FIG. 3 taken along line III-III. A drive shaft 40 is located within the generator 20 and is the primary structure for supporting a variety of components. The drive shaft 40 can have a single diameter or one that can vary along its length. The drive shaft 40 is supported by spaced bearings 44 and configured to rotate about a rotational axis 41. Several of the elements of the generator 20 have a fixed component and a rotating component, with the fixed component fixed relative to the housing 18 and with the rotating component being provided on, or rotatably fixed relative to the drive shaft 40. Examples of these elements can include a main machine 50 or electrical machine, housed within a main machine cavity 51, an exciter 60, and a PMG 70.

It will be appreciated that the electrical machine can be a Pulse-Width Modulation (PWM) driven electrical machine, or any other suitable electrical machine such as, but not limited to, a 50/60 Hz sine wave machine. The corresponding rotating component includes a main machine rotor 52, an exciter rotor 62, and a PMG rotor 72, respectively, and the corresponding fixed component includes a main machine stator 54 or stator assembly, an exciter stator 64, and a PMG stator 74. In this manner, the main machine rotor 52, exciter rotor 62, and PMG rotor 72 are disposed on and co-rotate with the drive shaft 40. The fixed components can be mounted to any suitable part of the housing 18, and include the main machine stator 54, exciter stator 64, and PMG stator 74. Collectively, the fixed components define an interior through which the drive shaft 40 extends and rotates relative to.

The main machine rotor 52, exciter rotor 62, and PMG rotor 72 can have a set of rotor poles. The main machine stator 54, exciter stator 64, and PMG stator 74 can have a set of stator poles. The set of rotor poles can generate a set of magnetic fields relative to the set of stator poles, such that the rotation of the rotor magnetic fields relative to the stator poles generate current in the respective stator components. Alternatively, it will be appreciated that in other arrangements, the set of stator poles can generate the set of magnetic fields relative the set of rotor poles, such that the rotation of the rotor relative the stator poles induces current in the rotor components. At least one of the rotor poles and stator poles can be formed by a core with a post and wire wound about the post to form a winding, with the winding having at least one end turn or end winding.

It can be seen in FIG. 4 that the main machine stator 54 includes a stator core 89 having at least one post or tooth. A set of stator windings 90 are formed when a conductor or conductive wire is wound about the post or stator core 89. The set of stator windings 90 can also include a winding segment that extends across either the front or rear of the post or stator core 89, forming at least one end turn 92.

During power-generating operations, the drive shaft 40 is mechanically powered, driven, or rotated by a force, such as the mechanical energy of the engine 10, about the rotational axis 41. The relative rotational motion of the drive shaft 40 and co-rotating components, including at least the main machine rotor 52, relative to the fixed or stationary stator components, including at least the main machine stator 54, generates electrical power in the set of stator windings 90 due to the interaction of the generator 20 magnetic fields. The electrical power generated in the set of stator windings 90 can be electrically conductively connected to, and further delivered to, at least one electrical load. In one non-limiting aspect, the generator 20 can provide the electrical power to a power distribution system or power distributed network.

Non-limiting aspects of the generator 20 can be any combination of known generators. For example, the main machine 50 can be either a synchronous or asynchronous generator. In addition to the aspects described herein, additional component, devices, or the like can be included to provide secondary generator 20 operations or functions. For instance, in one non-limiting aspect of the disclosure, the generator 20 can include electromechanical accessories, or other accessories driven from the rotation of the drive shaft 40, including but not limited to, an oil pump, a fluid compressor, a hydraulic pump, or the like.

Further non-limiting aspects of the generator 20 can also optionally include oil cooling or an oil cooling system for controlling the supply of oil to the oil cooling system. The cooling oil can be used to dissipate heat generated by the electrical and mechanical functions of the generator 20. The oil system can also provide for lubrication of the generator 20. In one non-limiting example, the cooling system can further include, for example, a cooling fluid reservoir and various cooling passages. The drive shaft 40 can provide one or more flow channels or paths for the main machine rotor 52, exciter rotor 62, and PMG rotor 72. In one non-limiting example aspect, a flow of cooling oil (shown as arrow 85) is arranged by way of a first port (e.g., 84 or 82), which can be provided via a main machine reservoir or coolant reservoir, to the drive shaft 40, to a shaft outlet port 91. While the generator 20 is shown as including the liquid coolant system, aspects of the disclosure are applicable to a generator 20 without a liquid coolant system.

In the above-mentioned aircraft generator, the PMG assembly 70 can be used to power the exciter stator 64, for example through a regulator (shown in FIG. 1). In addition to this PMG assembly 70, there can be other PMG assemblies 70 used to power on-board aircraft flight computers, or a variety of other loads such as, but not limited to, actuators, electrical busses, batteries, deicing equipment, motors, flight controls, back up equipment, or any combination thereof.

Figure 5:
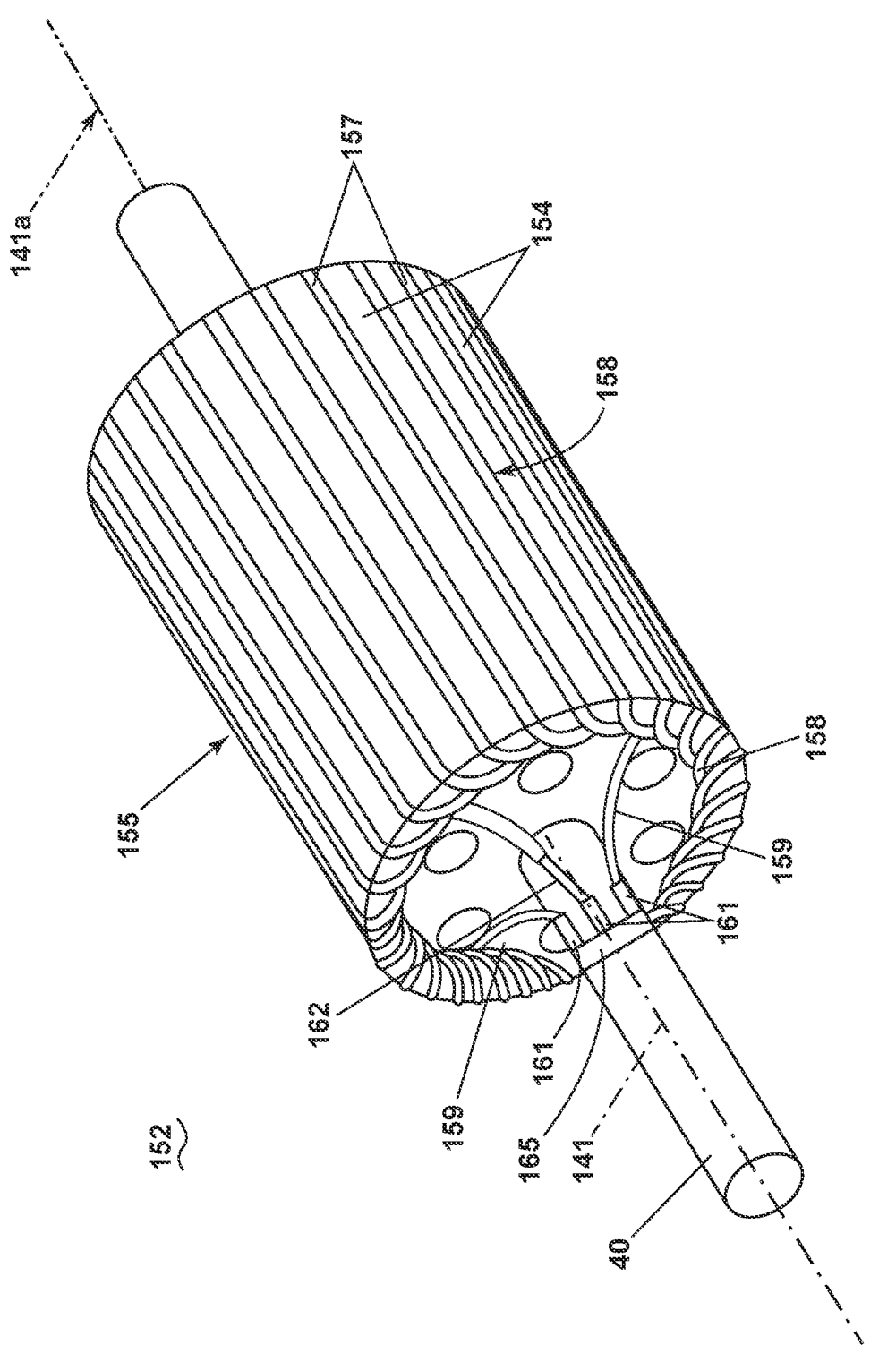
FIG. 5 is an isometric view of an exterior of a portion of a rotor assembly in accordance with various aspects described herein.

FIG. 5 illustrates an isometric view of a rotor assembly 152 for an electrical machine in accordance with non-limiting aspects, with some parts omitted for clarity. While illustrated and described herein, for case of description and understanding, as one example of a rotor assembly 152 for a main generator, it will be appreciated that in other non-limiting aspects, the rotor assembly 152 can alternatively be a rotor assembly for an exciter. As shown, the rotor assembly 152 can include a generally annular rotor core 155 having a central longitudinal axis 141 defining a common axis of rotation 141a. The rotor core 155 is concentrically coupled to a rotatable drive shaft, such as the drive shaft 40. The rotor core 155 can further include a set of posts 154 or teeth respectively extending from the rotor core 155 radially outward away from the longitudinal axis 141. The set of posts 154 can further define a set of slots 157, such as openings, gaps, spaces, or the like, between adjacent posts 154. At least a subset of the slots 157 can be wound with or receive a conductive wire or set of conductive wires to form a set of rotor windings 158 therein. For example, in non-limiting aspects, the rotor windings 158 can be formed from magnet wire. Each rotor winding 158 includes a respective end portion or termination end 159. The termination end 159 extends outward from a respective slot 157 for electrical connection with a connector or terminal 161. In various non-limiting aspects, the terminal 161 can be coupled to an electrical circuit 165 such as a rectifier circuit 165 as is known in the art. In other aspects, the terminal 161 can be electrically coupled to any other desired electrical element or circuit 165, such as a commutator, slip rings, and the like, without departing from the scope of the disclosure. It will be appreciated that in some aspects, as shown, the termination ends 159 can be electrically coupled to a respective conductive input lead 162. For example, the termination ends 159 can be electrically coupled to the input lead 162 such as a wire or cable which is in turn electrically coupled to the terminal 161. In this way, an input lead 162 can define the respective termination end 159 of a rotor winding 158, and can electrically conduct current (e.g., a DC current) from the terminal 161 to the rotor winding 158.

Figure 6:
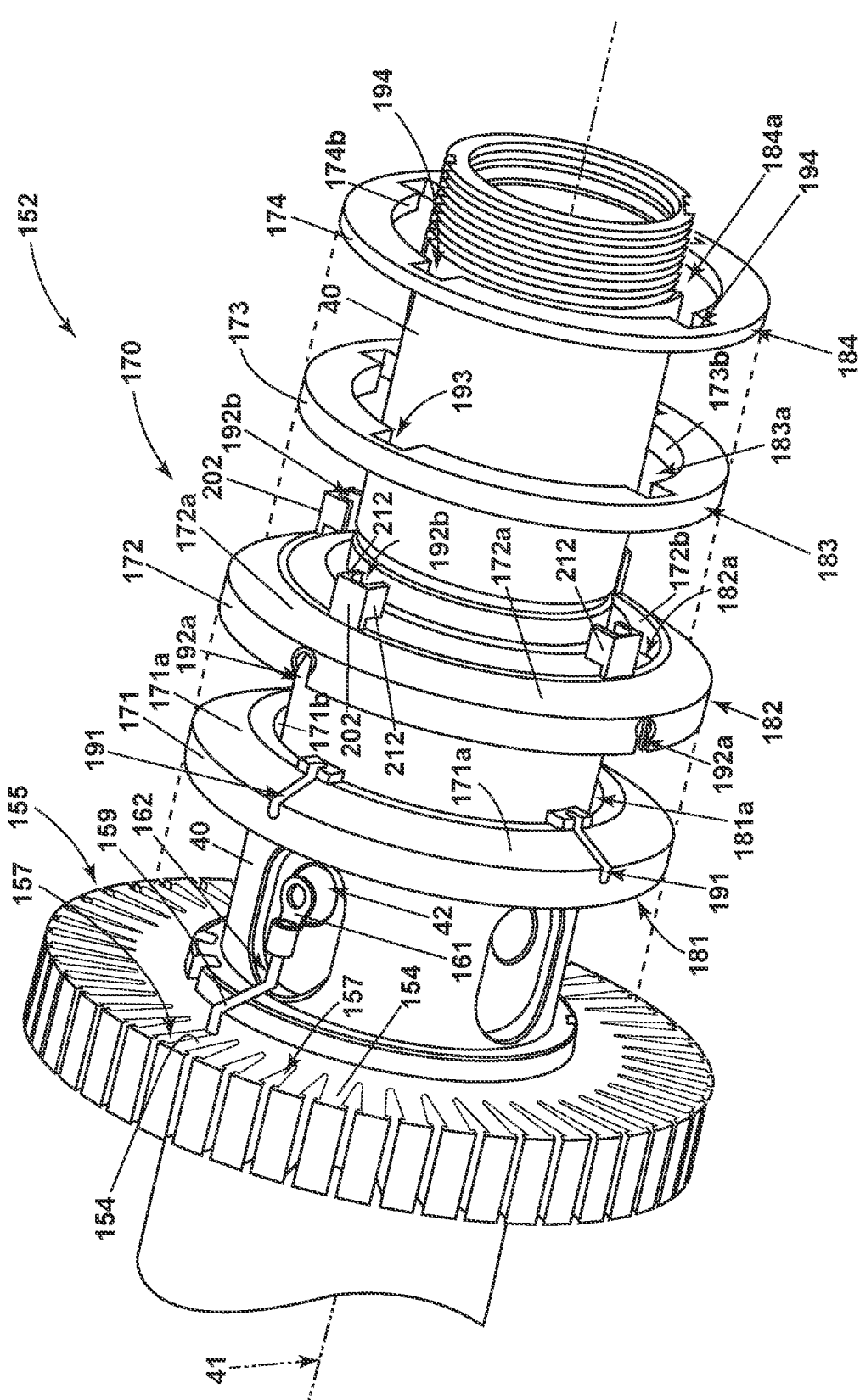
FIG. 6 is an isometric view of the rotor assembly of FIG. 5 having a lead retention assembly, which is depicted in exploded format in accordance with various aspects described herein.

A more detailed depiction of the rotor assembly 152 of FIG. 5 is shown in FIG. 6, which illustrates an isometric view of the rotor assembly 152 with portions of the rotor core 155 and windings 158 omitted for clarity. As shown, a single termination end 159 extends from a respective slot 157. While one termination end 159 is depicted for case of description and understanding, it will be appreciated that aspects are not so limited, and aspects can include any desired number of termination ends 159, or input leads 162, or both, extending from any desired number of slots 157. The termination end 159 (or conductive input lead 162) is coupled to a terminal 161, which can be coupled to the electrical circuit 165 (shown in FIG. 5). For example, in one non-limiting aspect, the electrical circuit 165 can be a rectifier circuit disposed within the drive shaft 40, and a rectifier lead or connector (not shown) can extend through a radially extending aperture 42 defined through the drive shaft 40 for connection to the terminal 161.

Figure 8:
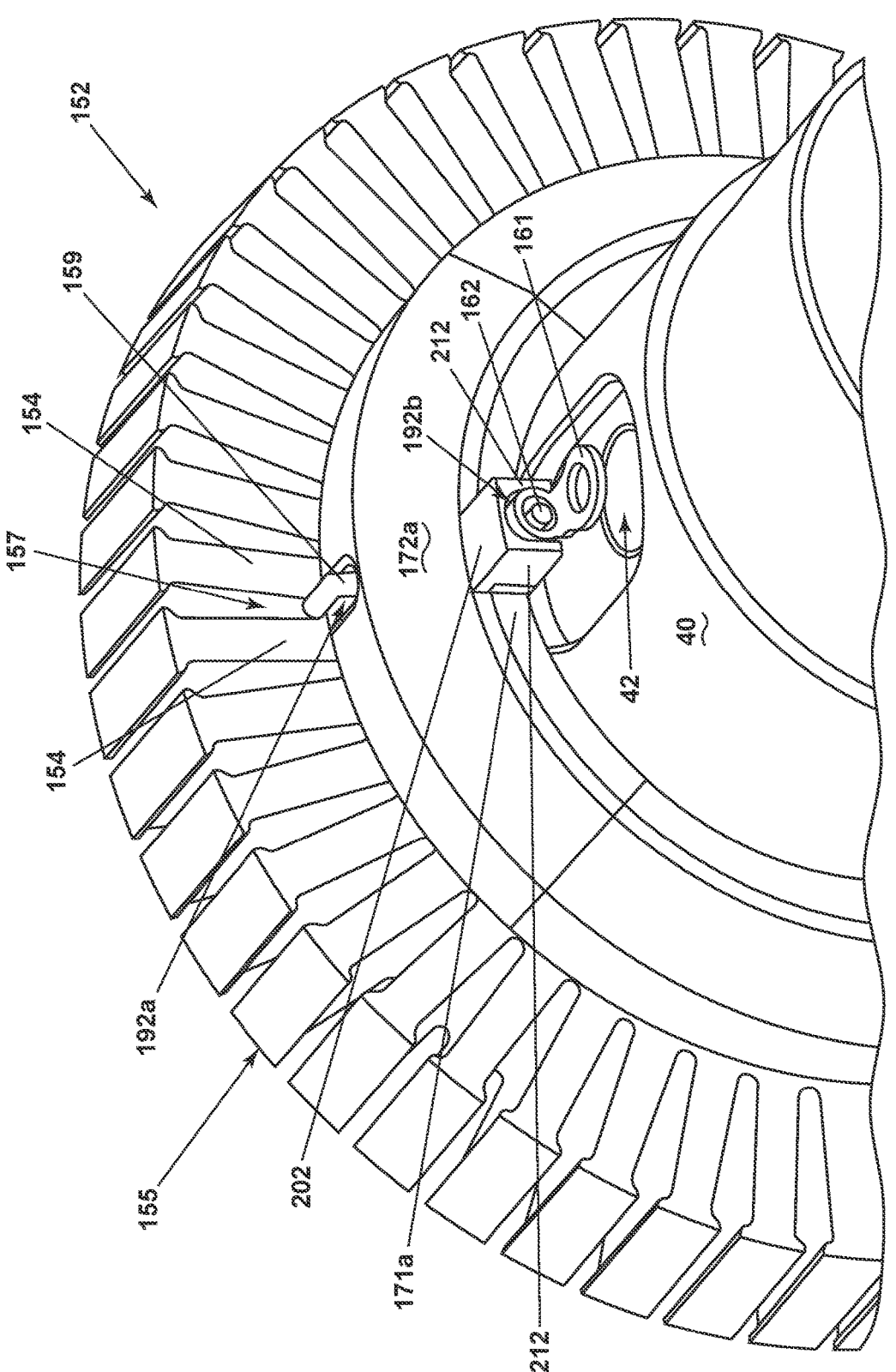
FIG. 8 is an isometric view of the rotor assembly of FIG. 7 with a second lead restraint of the lead retention assembly installed.
Figure 9:
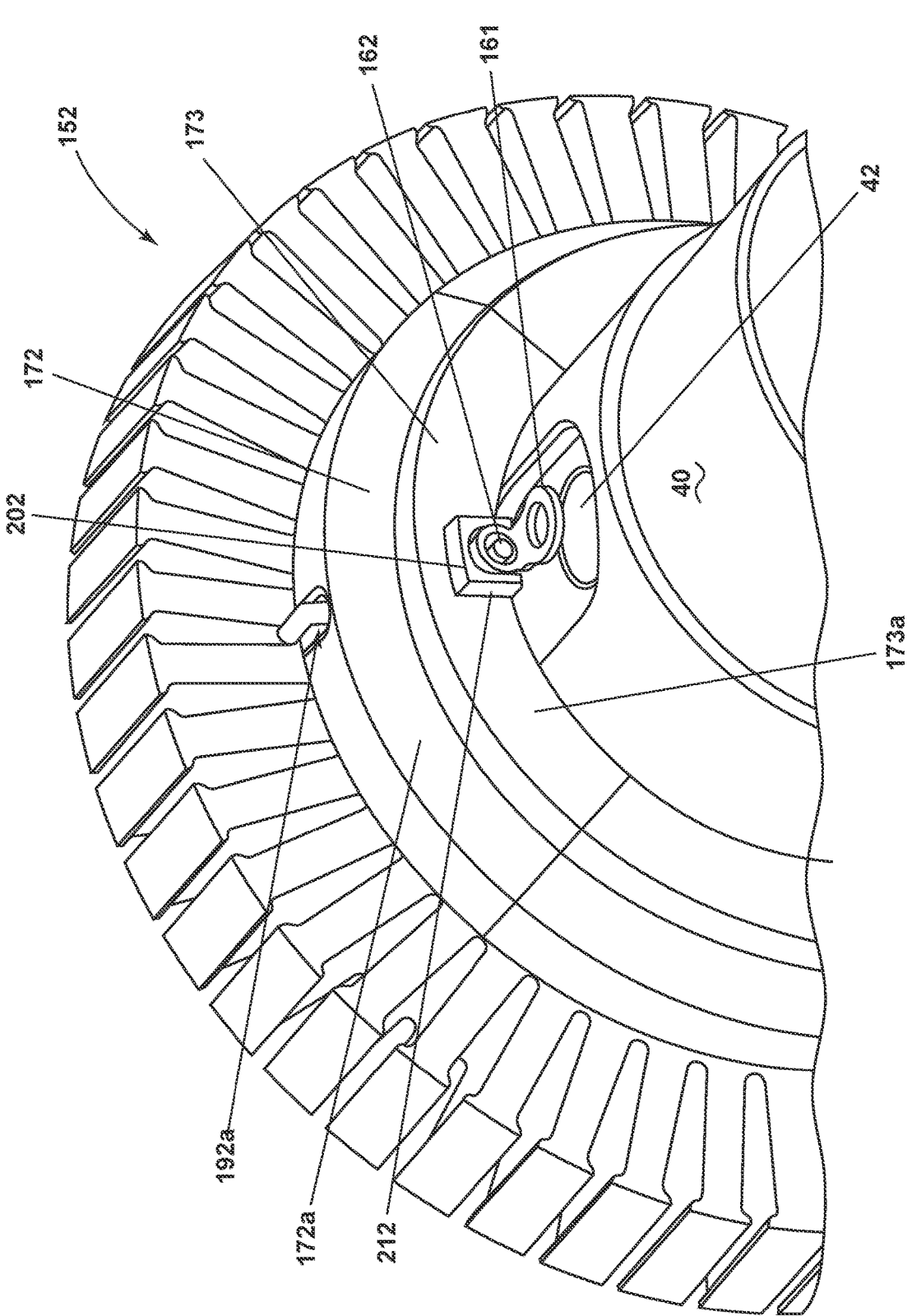
FIG. 9 is an isometric view of the rotor assembly of FIG. 8 with a first retention collar of the lead retention assembly installed.
Figure 10:
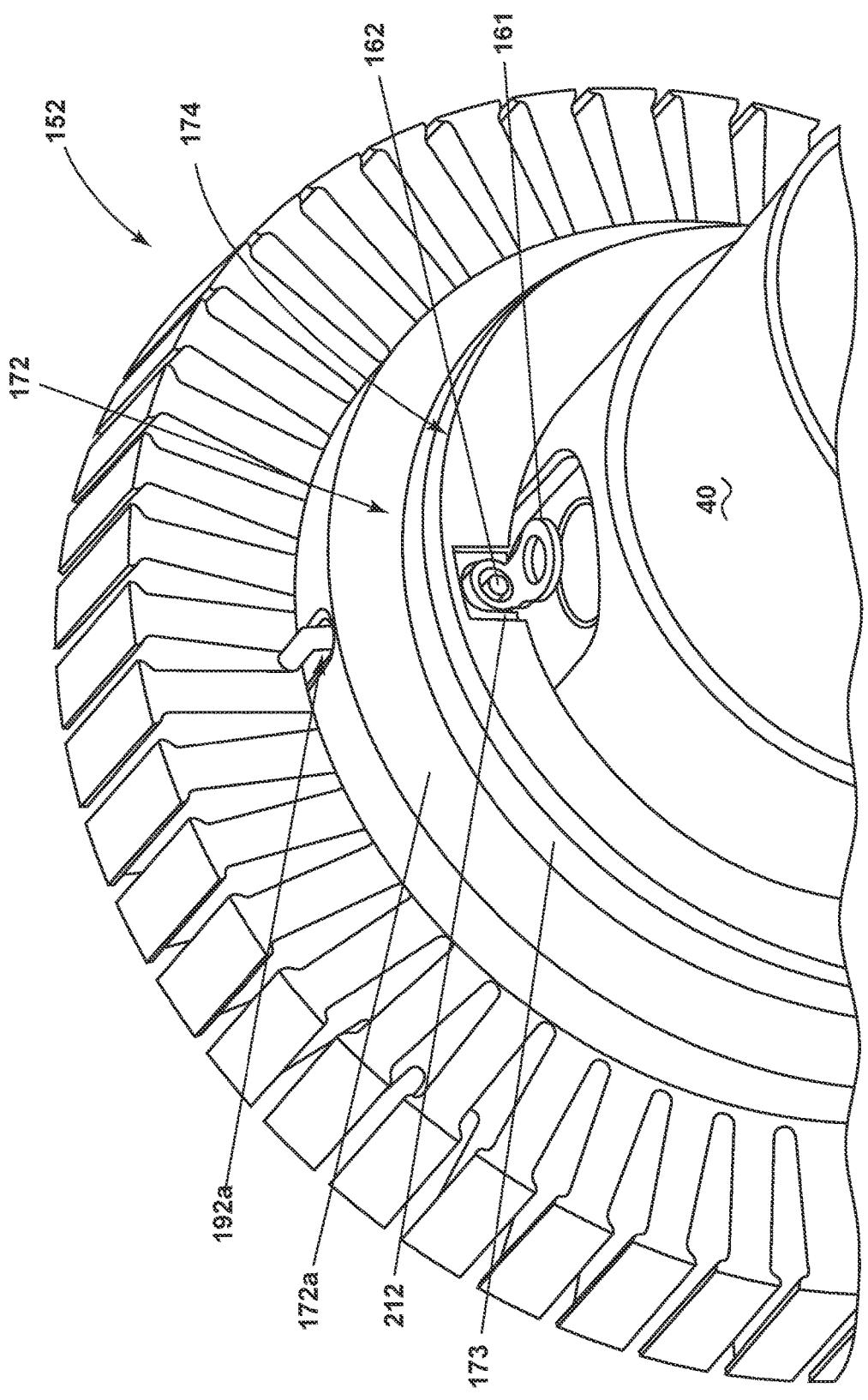
FIG. 10 is an isometric view of the rotor assembly of FIG. 9 with a second retention collar of the lead retention assembly installed.

As depicted in FIG. 6, the rotor assembly 152 is shown with a lead retention assembly 170, which is depicted, for case of understanding, as an exploded assembly. In non-limiting aspects, the lead retention assembly 170 includes a first lead restraint 171 and a second lead restraint 172, an optional retention collar 173 and an optional second retention collar 174. FIG. 8 shows a close-up view of at least a portion of an assembled lead retention assembly 170 that includes the first lead restraint 171 and the second lead restraint 172, but not the first retention collar 173 or the second retention collar 174. In further non-limiting aspects, the lead retention assembly 170 can optionally include, the first retention collar 173 in addition to the first lead restraint 171 and the second lead restraint 172. FIG. 9 shows a close-up view of at least a portion of an assembled lead retention assembly 170 that includes the first lead restraint 171, the second lead restraint 172, and the first retention collar 173, but not the second retention collar 174. In yet further non-limiting aspects, the lead retention assembly 170 can optionally include the second retention collar 174 in addition to the first lead restraint 171, the second lead restraint 172, and the first retention collar 173. FIG. 10 shows a close-up view of at least a portion of an assembled lead retention assembly 170 that includes the first lead restraint 171, the second lead restraint 172, the first retention collar 173, and the second retention collar 174.

Figure 7:
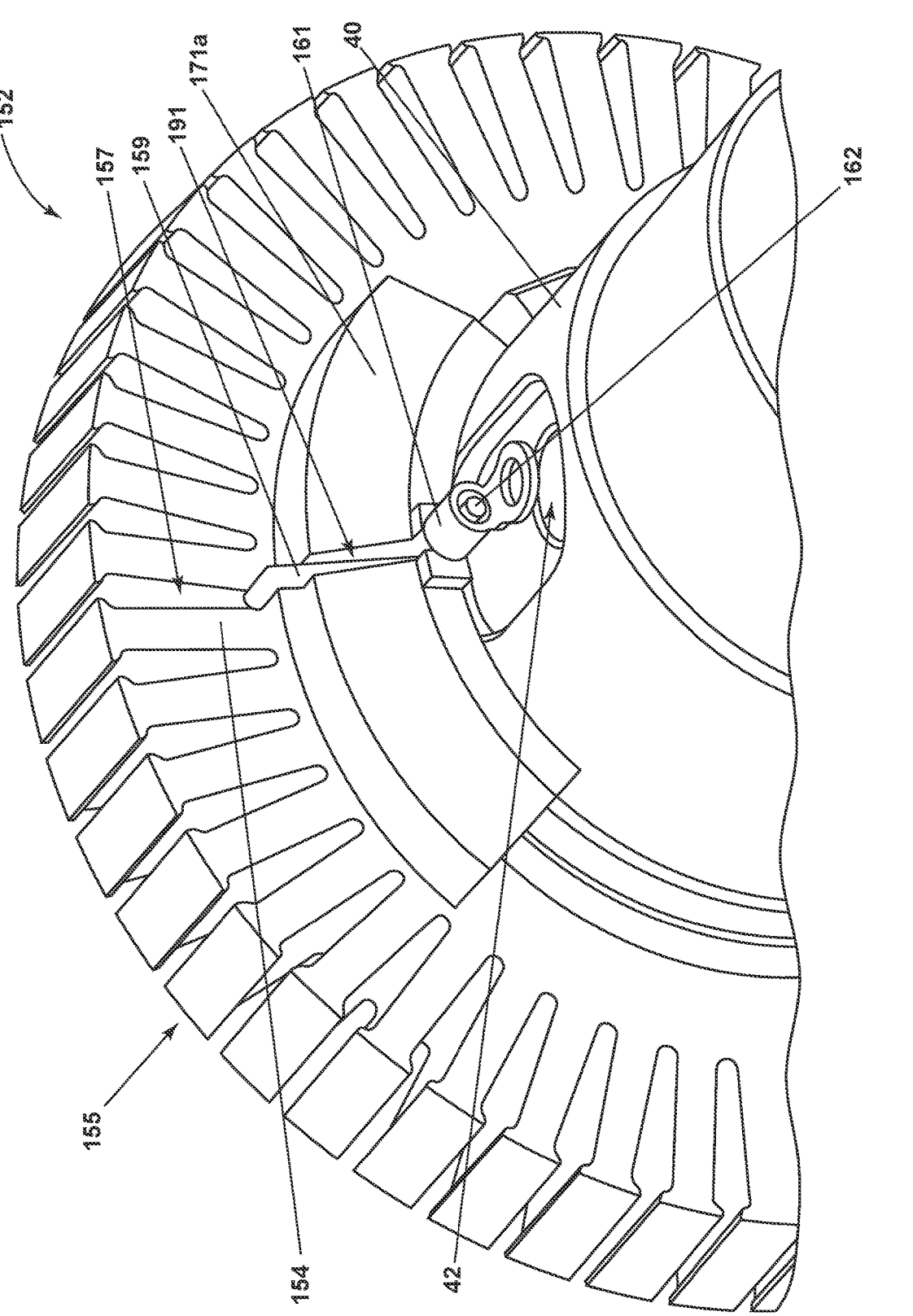
FIG. 7 is an isometric view of the rotor assembly of FIG. 6 with a first lead restraint of the lead retention assembly installed.

The first lead restraint 171 is rotatably coupled to the drive shaft 40 at a first axial end of the rotor core 155 (as shown in FIG. 7) and is disposed radially inward from the termination end 159. Accordingly, at least a portion of the termination end 159 extends further radially outward than does the first lead restraint 171. In some non-limiting examples, the first lead restraint 171 can be situated axially against the rotor core 155. The first lead restraint 171 defines a radially-extending channel 191 therein, wherein the termination end 159, or conductive input lead 162, or both is disposed in the channel 191. The channel 191 is sized to snugly or rigidly retain the termination end 159 or the conductive input lead 162, or both therein. As illustrated, in some aspects, the first lead restraint 171 can include a first annular structure 181 concentrically aligned with the drive shaft 40. The first annular structure 181 can define a central first bore 181a therethrough. For example, the first lead restraint 171 can include a first radially inner surface 171b defining the first bore 181a. The first bore 181a can be sized to receive the drive shaft 40 therethrough, for example via a friction fit. The first lead restraint 171 can be coupled to the drive shaft 40 along the first radially inner surface 171*b*. The first lead restraint 171 can be formed from an electrically insulative material. Accordingly, the first lead restraint 171 can electrically insulate the termination end 159 or input lead 162, or both from the drive shaft 40 or other electrically conductive parts. In other non-limiting aspects, a radially outer surface of the first lead restraint 171 can be coated with an electrically insulative material.

FIG. 7. depicts a portion of the rotor assembly 152 of FIG. 6 illustrating an exemplary first lead restraint 171 installed, with portions of the rotor core 155 and windings 158, second lead restraint 172, first retention collar 173, and the second retention collar 174 omitted for clarity. As shown, in some non-limiting aspects, the first lead restraint 171 can include a set of one or more first arcuate segments 171*a*. One or more of the first arcuate segments 171*a* can define a respective channel 191 therein. For example, in non-limiting aspects, the number of first arcuate segments 171*a* can correspond to the number of termination ends 159 extending from the rotor core 155. In other non-limiting aspects, for example when the rotor assembly 152 is used in a multi-phase electrical machine, the number of first arcuate segments 171*a* can correspond to the number of poles in the electrical machine. Each termination end 159 or input lead 162, or both, can be disposed or rigidly retained in a respective channel 191. In some aspects, the set of first arcuate segments 171*a* can be coupled together to define the annular structure 181 (shown in FIG. 6). In other aspects, the first arcuate segments 171*a* can be circumferentially spaced from each other such that respective gaps are defined therebetween.

Referring to FIG. 8, the second lead restraint 172 is rotatably coupled to the first lead restraint 171 (shown in FIG. 7), or the drive shaft 40, or both. As illustrated in FIG. 6, in aspects, the second lead restraint 172 can include a second annular structure 182 concentrically aligned with the first lead restraint 171, or the drive shaft 40, or both. The second annular structure 182 can define a central second bore 182*a* therethrough. For example, the second lead restraint 172 can include a second radially inner surface 172*b* defining the second bore 182*a*. The second bore 182*a* can be sized to receive the drive shaft 40 therethrough, for example via a friction fit. The second lead restraint 172 can be coupled to the drive shaft 40 along the second radially inner surface 172*b*. The second lead restraint 172 is disposed at an axial end of the first lead restraint 171, and arranged to cover the channel 191 and enclose or cover the termination end 159 or input lead 162, or both, within the channel 191. In some aspects, the second lead restraint 172 can define a slot, groove, notch, or first recess 192*a*, arranged in registry with the channel 191 to define a radially outward portion of the channel 191.

The second lead restraint 172 can be formed from an electrically insulative material. For example, the second lead restraint 172 can electrically insulate the termination end 159, the terminal 161, the input lead 162, or combination thereof, from inadvertent contact with electrically conductive parts. In other non-limiting aspects, the radially inner surface 172*b* of the second lead restraint 172 can be coated with an electrically insulative material.

In non-limiting aspects, the second lead restraint 172 can define a body and can further include a terminal cover member 202. The terminal cover member 202 can extend axially from the body of the second lead restraint 172. The terminal cover member 202 can include a second recess 192*b* defined therein. The second recess 192*b* is sized to receive at least a portion of the terminal 161 therein. The terminal cover member 202 is disposed radially outward from and in registration with the terminal 161 to at least radially cover the terminal 161 (e.g., as shown in FIG. 8). In non-limiting aspects, the terminal cover member 202 can further circumferentially surround the terminal 161. For example, the terminal cover member 202 can include a set of opposingly-spaced wall members 212, having the terminal 161 disposed therebetween. In non-limiting aspects, the wall members 212 are spaced to snugly or rigidly retain the terminal 161 therebetween. As such, the terminal cover member 202 can prevent a radially outward movement and/or a circumferential movement of the termination end 159 or the input lead 162, or both.

FIG. 8 depicts a portion of the rotor assembly 152 of FIG. 6 having the first and second lead restraints 171, 172 installed, with portions of the rotor core 155 and windings 158, as well as the first retention collar 173 and the second retention collar 174 omitted for clarity. In some non-limiting aspects, the second lead restraint 172 can include one or more second arcuate segments 172*a*. At least one of the second arcuate segments 172*a* can define a respective first recess 192*a* therein. For example, the number of second arcuate segments 172*a* can correspond to the number of termination ends 159 or input leads 162 extending from the rotor core 155. In other non-limiting aspects, for example when the rotor assembly 152 is used in a multi-phase electrical machine, the number of first arcuate segments 171*a* can correspond to the number of phases in the electrical machine. Each termination end 159 or input lead 162, or both can be radially covered within a respective channel 191 (shown in FIG. 7) by a respective second arcuate segment 172*a*. In some aspects, the second arcuate segments 172*a* can be coupled together to define the second annular structure 182.

FIG. 9 depicts a portion of rotor assembly 152 of FIG. 6 having the first and second lead restraints 171, 172 and the first retention collar 173 installed, with portions of the rotor core 155 and windings 158, and second retention collar 174 omitted for clarity. In FIG. 9, the first lead restraint 171 is hidden from view. With simultaneous reference to FIGS. 6 and 9, in non-limiting aspects, the first retention collar 173 is rotatably coupled to the second lead restraint 172, the drive shaft 40, or both. The first retention collar 173 is disposed at an axial end of the second lead restraint 172. In non-limiting aspects the first retention collar 173 is coupled to an axially facing surface of the second lead restraint 172. For example, as illustrated, the second lead restraint 172 is disposed axially between the first lead restraint 171 and the first retention collar 173. In some aspects, the first retention collar 173 can define a slot, groove, notch, or third recess 193, arranged in registry with, and sized to receive the terminal cover member 202 therein.

As illustrated, in some aspects, the first retention collar 173 can include or have a third annular structure 183 coupled to and concentrically aligned with, the second lead restraint 172 or the drive shaft 40, or both. The third annular structure 183 can define a central third bore 183*a* therethrough. For example, the first retention collar 173 can include a third radially inner surface 173*b* defining the third bore 183*a*. The third bore 183*a* can be sized to receive the drive shaft 40 therethrough, for example via a friction fit. In other aspects, the first retention collar 173 can be formed of metallic material and can be coupled to the drive shaft 40 by a weld or braze. The first retention collar 173 can be coupled to the drive shaft 40 along the third radially inner surface 173*b*. In some aspects, the third bore 183*a* can include or be in communication with the third recess 193. For example, the third recess 193 can extend radially outward from the third bore 183*a*. In this way, the third recess 193 can define a keyway to snugly or rigidly capture the terminal cover member 202 therein. As such, the first retention collar 173 can prevent a radially outward movement and/or a circumferential movement of the termination end 159 or input lead 162, or both, and the terminal cover member 202.

In some non-limiting aspects, the first retention collar 173 can include one or more third arcuate segments 173*a*. The third arcuate segments 173*a* can define respective third recesses 193 therein. For example, the number of third arcuate segments 173*a* can correspond to the number of second arcuate segments 172*a*, or terminal cover members 202, or both. In some aspects, as shown in FIG. 6, the third arcuate segments 173*a* can be coupled together to define the third annular structure 183.

The first retention collar 173 can be formed from an electrically insulative material. Accordingly, the first retention collar 173 can electrically insulate the terminal cover member 202 from the drive shaft 40 or other electrically conductive parts. In other non-limiting aspects, a radially outer surface of the first terminal cover member 202 can be coated with an electrically insulative material. In other non-limiting aspects, the first retention collar 173 can be metallic.

Referring to FIG. 6, in non-limiting aspects, the second retention collar 174 is rotatably coupled to the drive shaft 40. The second retention collar 174 is disposed at an axial end of the first retention collar 173. In some aspects, the second retention collar 174 can include or have a fourth annular structure 184 circumscribing and coupled to the drive shaft 40. The second retention collar 174 can be concentrically aligned with the drive shaft 40. The fourth annular structure 184 can define a central fourth bore 184*a* therethrough. The fourth bore 184*a* can be sized to receive the drive shaft 40 therethrough, for example via a friction fit. In other aspects, the second retention collar 174 can be formed of metallic material and can be coupled to the drive shaft 40 by a weld or braze. For example, the second retention collar 174 can include a fourth radially inner surface 174*b* defining the fourth bore 184*a*. The second retention collar 174 can be coupled to the drive shaft 40 along the fourth radially inner surface 174*b*.

In some aspects, the second retention collar 174 can define a fourth recess 194, arranged in registry with, and to receive the terminal cover member 202 therein. In some aspects, the fourth bore 184*a* can include or be in communication with the fourth recess 194. For example, the fourth recess 194 can extend radially outward from the fourth bore 184*a*. In this way, the fourth recess 194 can define a keyway to snugly or rigidly capture the terminal cover member 202 therein. As such, the second retention collar 174 can prevent a radially outward movement and/or a circumferential movement of the termination end 159 or input lead 162, or both, and the terminal cover member 202. Furthermore, the second retention collar 174 can prevent an axial movement of the first and second, lead restraints 171, 172, and the first retention collar 173.

FIG. 10 depicts a portion of rotor assembly 152 of FIG. 6 having the first and second lead restraints 171, 172 and the first and second retention collars 173, 174 installed, with portions of the rotor core 155 and windings 158 omitted for clarity.

In non-limiting aspects, the second retention collar 174 is coupled to an axially facing surface of the first retention collar 173 (e.g., as shown in FIG. 10). For example, as illustrated, the first retention collar 173 is disposed axially between the second lead restraint 171 and the second retention collar 174.

Figure 11:
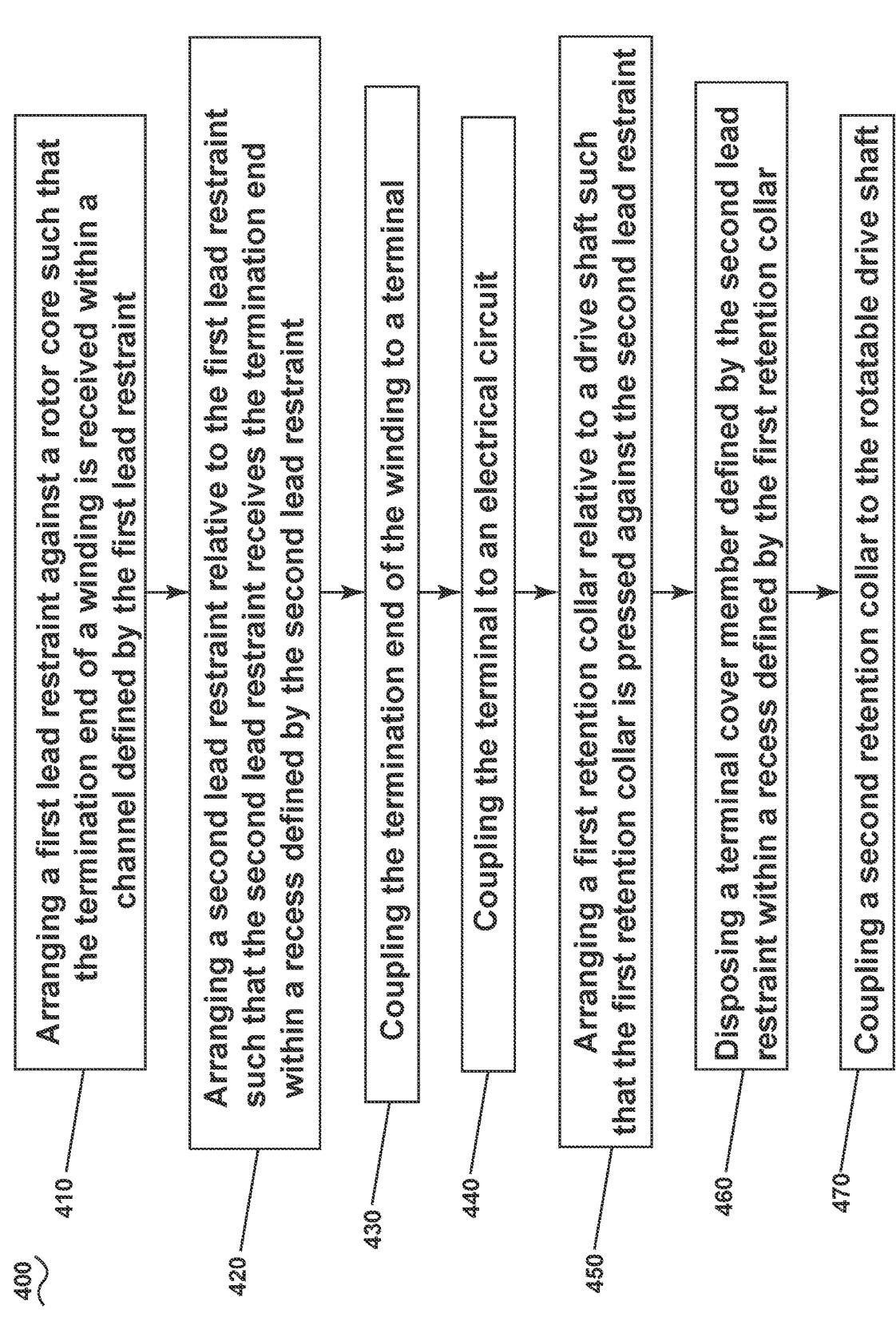
FIG. 11 depicts a flow diagram illustrating a method of assembling a lead retention assembly in accordance with various aspects described herein.

FIG. 11 illustrates a non-limiting example of a method 400 of assembling a lead retention assembly 170 onto a rotor assembly having a drive shaft 40 and a rotor core coupled with the drive shaft 40. While the method 400 will be described, for case of understanding with reference to the rotor assembly 152 of FIGS. 5-10, aspects of the method 400 are not so limited and can be implemented in other electrical systems and devices without departing from the scope of the disclosure. For example, while illustrated and described herein, for case of description and understanding, as one example of a method of assembling a lead retention assembly 170 on a rotor assembly 152 for a main generator, it will be appreciated that in other non-limiting aspects, the rotor assembly 152 can alternatively be a rotor assembly 152 for an exciter.

In aspects of the method 400, the rotor assembly 152 can include the annular rotor core 155 having the central longitudinal axis 141 defining a common axis of rotation 141*a*. The rotor core 155 is concentrically coupled to the drive shaft 40. The rotor core 155 can further include the set of posts 154 or teeth respectively extending from the rotor core 155 radially outward away from the longitudinal axis 141. The set of posts 154 can further define the set of slots 157, such as openings, gaps, spaces, or the like, between adjacent posts 154. At least a subset of the slots 157 can be wound with or receive a conductive wire or set of conductive wires to form a set of rotor windings 158 therein. For example, in non-limiting aspects, the rotor windings 158 can be formed from magnet wire. Each rotor winding 158 includes the respective end portion or termination end 159. The termination end 159 can extend outward from a respective slot 157 for electrical connection with a connector or terminal 161.

The method 400 can include, at 410, arranging the first lead restraint 171 against the rotor core 155 of the rotor assembly 152 such that the termination end 159 of a winding is received within the channel 191 defined by the first lead restraint 171. The channel 191 can be sized to snugly or rigidly retain the termination end 159 or the input lead 162, or both therein.

The method 400 can further include at 420, arranging a second lead restraint 172 relative to the first lead restraint 171 such that the second lead restraint 172 receives the termination end 159 within a first recess 192*a* defined by the second lead restraint 172. For example, the first recess 192*a* can be arranged in registry with the channel 191 to define a radially outward portion of the channel 191. The second lead restraint 172 can be disposed at an axial end of the first lead restraint 171, and arranged to cover the channel 191 and enclose or cover the termination end 159 or input lead 162, or both, within the channel 191. In non-limiting aspects, the second lead restraint 172 can cover at least a portion of the termination end 159 and the first lead restraint 171. In non-limiting aspects, the first and second lead restraints 171, 172 can each circumscribe the drive shaft.

The method 400 can further include, at 430, electrically coupling the termination end 159 to a terminal 161, and, at 440, electrically coupling the terminal 161 to an electrical circuit 165. For example, the terminal 161 can be coupled to a rectifier circuit as is known in the art. In other aspects, the terminal 161 can be electrically coupled to any other desired electrical element or circuit 165, such as a commutator, slip rings, and the like, without departing from the scope of the disclosure. In some aspects, the termination ends 159 can be electrically coupled to a respective input lead 162. For example, the termination ends 159 can be electrically coupled to the input lead 162 such as a wire or cable which is in turn electrically coupled to the terminal 161. In this way, an input lead 162 can define the respective termination end 159 of a respective rotor winding 158, and can electrically conduct electrical current (e.g., a DC current) from the terminal 161 to the rotor winding 158.

In some aspects, the second lead restraint 172 defines a body and further includes the terminal cover member 202. The terminal cover member 202 can extend axially from the body of the second lead restraint 172. The terminal cover member 202 can include a second recess 192b defined therein. The second recess 192b is sized to receive at least a portion of the terminal 161 therein. The terminal cover member 202 is disposed radially outward from and in registration with the terminal 161 to at least radially cover the terminal 161. In such aspects, the method 400 can include, at 440, disposing the terminal 161 within the second recess 192b.

The method 400 can further include, at 450, arranging the first retention collar 173 relative to the drive shaft 40 such that the first retention collar 173 is pressed against the second lead restraint 172. For example, the second lead restraint 173 can be disposed between the first lead restraint 171 and the first retention collar 173.

In some aspects, the first retention collar 173 can define a third annular structure 183 coupled to and concentrically aligned with, the second lead restraint 172 or the drive shaft 40, or both. The third annular structure 183 can define the central third bore 183a therethrough. For example, the first retention collar 173 can include the third radially inner surface 173b defining the third bore 183a. The third bore 183a can be sized to receive the drive shaft 40 therethrough, for example via a friction or interference fit. In other aspects, the first retention collar 173 can be formed of metallic material and can be coupled to the drive shaft 40 by a weld or braze. The first retention collar 173 can be coupled to the drive shaft 40 along the third radially inner surface 173b. In some aspects, the third bore 183a can include or be in communication with the third recess 193. For example, the third recess 193 can extend radially outward from the third bore 183a. In this way, the third recess 193 can define a keyway to snugly or rigidly capture the terminal cover member 202 therein.

In aspects, the first retention collar 173 can define the third recess 193, arranged in registry with, and sized to receive the terminal cover member 202 therein. The method 400 can include, at 460, disposing the terminal cover member 202 within the third recess 193.

The method 400 can include, at 470, coupling the second retention collar 174 to the rotatable drive shaft 40. In some aspects, the second retention collar 174 can be configured as the fourth annular structure 184 circumscribing and coupled to the drive shaft 40. The second retention collar 174 can be concentrically aligned with the drive shaft 40. The fourth annular structure 184 can define a central fourth bore 184a therethrough. The fourth bore 184a can be sized to receive the drive shaft 40 therethrough, for example via a friction fit. In some aspects, the second retention collar 174 can be coupled to the drive shaft 40 by a weld or braze. The second retention collar 174 can include the fourth radially inner surface 174b defining the fourth bore 184a. The second retention collar 174 can be coupled to the drive shaft 40 along the fourth radially inner surface 174b. In some aspects, the fourth bore 184a can include or be in communication with the fourth recess 194. For example, the fourth recess 194 can extend radially outward from the fourth bore 184a. In this way, the fourth recess 194 can define a keyway to snugly or rigidly capture the terminal cover member 202 therein. The second retention collar 174 can be disposed at an axially outer surface of the first retention collar 173 opposite the second lead restraint 172. For example, the first retention collar 173 can be disposed axially between the second lead restraint 172 and the second retention collar 174. In some aspects, the second retention collar 174 can define the fourth recess 194, arranged in registry with, and sized to receive the terminal cover member 202 therein.

The sequences depicted are for illustrative purposes only and is not meant to limit the method 400 in any way as it is understood that the portions of the method can proceed in a different logical order, additional or intervening portions can be included, or described portions of the method can be divided into multiple portions, or described portions of the methods can be omitted without detracting from the described method. For example, the method 400 can include various other intervening steps. The examples provided herein are meant to be non-limiting.

Advantages of the aspects disclosed herein include, among other things, a reduced cost of manufacturing of the electrical machine and/or rotor assembly when compared to traditional rotor and electrical machine assemblies This is because, for at least the reasons listed above, the electrical machine and rotor assembly including the aspects as described herein can be assembled without conventional methods, such as wrapping of leads with glass tape or potting with insulative epoxies and the like. Additionally, aspects as described herein can be configured to be modular, which can case installation and manufacturing. Furthermore, in some aspects, one or more of the first and second lead restraints and the first and second retention collars can comprise arcuate segments which case assembly and manufacturing. For at least the reasons above, this can decrease the total cost associated with manufacturing the rotor assembly without sacrificing performance parameters (e.g., power density and voltage output).

Yet another advantage of the aspects disclosed herein includes increased reliability of a rotor assembly and/or electrical machine as terminal connectors are prevented from rotating, which reduces the potential for shorting the terminal compared to conventional designs. Additionally, reliability can be increased by reducing lead movement and vibration, which can eliminate or reduce the occurrence of breakage of the rotor input leads.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

Further aspects of the disclosure are provided by the subject matter of the following clauses:

An electrical machine comprising: a rotatable drive shaft; a rotor assembly rotatably coupled to and circumscribing the drive shaft, the rotor assembly including a rotor core defining a set of axially-extending slots, and a set of rotor windings disposed in the slots, the set of rotor windings including a portion extending axially out of a slot defining a termination end, and electrically connected to a terminal; a first lead restraint, rotatably coupled to the drive shaft, and disposed radially inward from the termination end, the first lead restraint defining a radially-extending channel therein, wherein a portion of the termination end is disposed in the channel; and a second lead restraint, rotatably coupled to the drive shaft, disposed radially outward from the first lead restraint, the second lead restraint arranged to cover the channel.

The electrical machine of any preceding clause, further comprising a first retention collar, rotatably coupled to the drive shaft, wherein the second lead restraint is disposed between the first lead restraint and the first retention collar.

The electrical machine of any preceding clause, wherein the second lead restraint defines a first recess arranged in registry with the channel and cooperative to define a radially outward portion of the channel.

The electrical machine of any preceding clause, wherein the second lead restraint further includes a terminal cover member extending therefrom, and defining a second recess arranged to receive the terminal therein.

The electrical machine of any preceding clause, wherein the first retention collar defines a third recess configured to receive the terminal cover member therein.

The electrical machine of any preceding clause, wherein at least one of the first lead restraint, the second lead restraint, or the first retention collar is electrically insulative.

The electrical machine of any preceding clause, wherein at least one of the first lead restraint, the second lead restraint, and the first retention collar define an annular structure circumscribing the rotatable drive shaft.

The electrical machine of any preceding clause, wherein at least one of the first lead restraint and second lead restraint are formed by a respective set of arcuate segments.

The electrical machine of any preceding clause, wherein the electrical machine is a multi-phase machine, comprising a first lead restraint and a second lead restraint for each respective phase.

The electrical machine of any preceding clause, further comprising a second retention collar circumscribing and fixedly coupled to the rotatable drive shaft at an axially outer surface of the first retention collar opposite the second lead restraint.

The electrical machine of any preceding clause, wherein the electrical machine is at least one of a motor, a generator, and a starter/generator.

A method of assembling a lead retention assembly onto a rotor assembly having a drive shaft and a rotor core coupled with the drive shaft, the method comprising: arranging a first lead restraint against the rotor core of the rotor assembly such that a termination end of a winding is received within a channel defined by the first lead restraint; arranging a second lead restraint relative to the first lead restraint such that the second lead restraint covers at least a portion of the termination end and the first lead restraint, and receives the termination end within a first recess defined by the second lead restraint and also such that the second lead restraint t.

The method of any preceding clause, further comprising electrically coupling the termination end to a terminal.

The method of any preceding clause, further comprising electrically coupling the terminal to an electrical circuit.

The method of any preceding clause, wherein the first and second lead restraints each circumscribe the drive shaft.

The method of any preceding clause, wherein the second lead restraint defines a body portion having a terminal cover member extending therefrom, the terminal cover member defining a second recess therein, the method further including disposing the terminal within the second recess.

The method of any preceding clause, further comprising arranging a first retention collar relative to the drive shaft such that the first retention collar is pressed against the second lead restraint and wherein the second lead restraint is disposed between the first lead restraint and the first retention collar.

The method of any preceding clause, wherein the first retention collar is coupled to the drive shaft via an interference fit.

The method of any preceding clause, wherein the first retention collar defines a third recess, the method further including disposing the terminal cover member within the second recess.

The method of any preceding clause, further comprising coupling a second retention collar to the rotatable drive shaft at an axially outer surface of the first retention collar opposite the second lead restraint.

A rotor assembly coupled to and circumscribing a rotatable drive shaft, the rotor assembly comprising: a rotor core defining a set of axially-extending slots, and a set of rotor windings disposed in the slots, the set of rotor windings including a portion extending axially out of a slot defining a termination end, and electrically connected to a terminal; a first lead restraint, rotatably coupled to the drive shaft, and disposed radially inward from the termination end, the first lead restraint defining a radially-extending channel therein, wherein a portion of the termination end is disposed in the channel; and a second lead restraint, rotatably coupled to the drive shaft, disposed radially outward from the first lead restraint, the second lead restraint arranged to cover the channel.

The rotor assembly of any preceding clause, further comprising a first retention collar, having a radially inner surface rotatably coupled to the drive shaft, wherein the second lead restraint is disposed between the first lead restraint and the first retention collar.

The rotor assembly of any preceding clause, wherein the second lead restraint defines a first recess arranged in registry with the channel and cooperative to form a radially outward portion of the channel.

The rotor assembly of any preceding clause, wherein the second lead restraint further includes a terminal cover member extending therefrom, and defining a second recess arranged to receive the terminal therein.

The rotor assembly of any preceding clause, wherein the first retention collar defines a third recess configured to receive the terminal cover member therein.

The rotor assembly of any preceding clause, wherein at least one of the first lead restraint, the second lead restraint, or the first retention collar are electrically insulative.

The rotor assembly of any preceding clause, wherein at least one of the first lead restraint, the second lead restraint, or the first retention collar define an annular structure circumscribing the rotatable drive shaft.

The rotor assembly of any preceding clause, wherein at least one of the first lead restraint and the second lead restraint are formed by a respective set of arcuate segments.

The rotor assembly of any preceding clause, further comprising a second retention collar circumscribing and fixedly coupled to the rotatable drive shaft at an axially outer surface of the first retention collar opposite the second lead restraint.

What is claimed is:

1. An electrical machine comprising:
a drive shaft rotatable about an axis of rotation;
a rotor assembly rotatably coupled to and circumscribing the drive shaft, the rotor assembly including a rotor core defining a set of axially-extending slots, and a set of rotor windings disposed in the axially-extending slots, the set of rotor windings including a portion extending axially out of a slot defining a termination end, and electrically connected to a terminal;
a first lead restraint, rotatably coupled to the drive shaft, and disposed radially inward from the termination end, the first lead restraint defining a radially-extending channel therein, wherein a portion of the termination end is disposed in the radially-extending channel; and
a second lead restraint, rotatably coupled to the drive shaft, and disposed at an axial end of the first lead restraint, the second lead restraint arranged to cover at least a portion of the radially-extending channel.

2. The electrical machine of claim 1, wherein the second lead restraint defines a first recess arranged in registry with the radially-extending channel and cooperative to define a radially outward portion of the radially-extending channel.

3. The electrical machine of claim 1, further comprising a first retention collar, rotatably coupled to the drive shaft, wherein the second lead restraint is disposed between the first lead restraint and the first retention collar.

4. The electrical machine of claim 2, wherein the second lead restraint further includes a terminal cover member extending from a body of the second lead restraint, the terminal cover member defining a second recess arranged to receive the terminal therein.

5. The electrical machine of claim 3, further comprising a second retention collar circumscribing and coupled to the drive shaft at an axially outer surface of the first retention collar opposite the second lead restraint.

6. The electrical machine of claim 3, wherein the first retention collar defines a third recess configured to receive the terminal cover member therein.

7. The electrical machine of claim 3, wherein at least a portion of one of the first lead restraint, the second lead restraint, or the first retention collar is electrically insulative.

8. The electrical machine of claim 3, wherein at least one of the first lead restraint, the second lead restraint, and the first retention collar define an annular structure circumscribing the rotatable drive shaft.

9. The electrical machine of claim 1, wherein at least one of the first lead restraint and second lead restraint are formed by a respective set of arcuate segments.

10. The electrical machine of claim 9, wherein the electrical machine is a multi-phase machine, comprising a respective first lead restraint and a second lead restraint corresponding to each phase.

11. The electrical machine of claim 10, wherein the electrical machine is at least one of a motor, a generator, and a starter/generator.

12. A method of assembling a lead retention assembly onto a rotor assembly having a drive shaft and a rotor core coupled with the drive shaft, the method comprising:
arranging a first lead restraint against the rotor core of the rotor assembly such that a termination end of a winding is received within a radially-extending channel defined by the first lead restraint; and
arranging a second lead restraint relative to the first lead restraint such that the second lead restraint covers at least a portion of the termination end and the first lead restraint, and receives the termination end within a first recess defined by the second lead restraint.

13. The method of claim 12, further comprising electrically coupling the termination end to a terminal.

14. The method of claim 13, further comprising electrically coupling the terminal to an electrical circuit.

15. The method of claim 12, wherein the first and second lead restraints each circumscribe the drive shaft.

16. The method of claim 12, wherein the second lead restraint defines a body portion having a terminal cover member extending therefrom, the terminal cover member defining a second recess therein, the method further including disposing the terminal within the second recess.

17. The method of claim 12, further comprising arranging a first retention collar relative to the drive shaft such that the first retention collar is pressed against the second lead restraint and wherein the second lead restraint is disposed between the first lead restraint and the first retention collar.

18. The method of claim 17, wherein the first retention collar is coupled to the drive shaft via an interference fit.

19. The method of claim 17, wherein the first retention collar defines a third recess, the method further including disposing a terminal cover member within a second recess.

20. The method of claim 17, further comprising coupling a second retention collar to the drive shaft at an axially outer surface of the first retention collar opposite the second lead restraint.

* * * * *